Aug. 4, 1931.  G. F. FISHER  1,817,356
HOLLOW CUSHION TIRE
Original Filed July 10, 1922
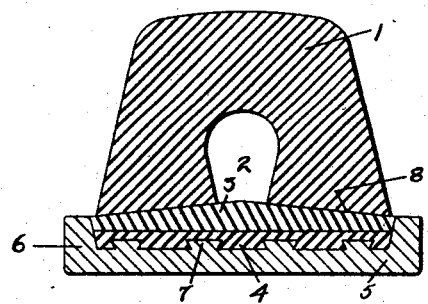
INVENTOR:
GEORGE F. FISHER
By  Ernest Hopkinson
ATTORNEY Patented Aug. 4, 1931

1,817,356

UNITED STATES PATENT OFFICE

GEORGE F. FISHER, OF QUINCY, MASSACHUSETTS, ASSIGNOR TO MORGAN & WRIGHT, OF DETROIT, MICHIGAN, A CORPORATION OF MICHIGAN

HOLLOW CUSHION TIRE

Original application filed July 10, 1922, Serial No. 573,868, now Patent No. 1,613,697. Divided and this application filed October 7, 1926. Serial No. 139,985.

This invention relates to solid tires of the cushion type having a longitudinally extending recess or cavity and secured by vulcanization to a metallic rim. The comprehensive object of the present invention is to provide a simple and wear resisting hollow cushion tire, which tire is vulcanized to a one piece imperforate type of metallic rim thereby obtaining strength and at the same time having the desirable resiliency of a cushion or hollow type of solid tire.

This application is a division of my previously filed application from which Patent No. 1,613,697, issued January 11, 1927.

The specific embodiment of the invention is illustrated in the accompanying drawing in which is shown a transverse sectional view of a tire mounted on its rim. As illustrated, the tire comprises an annular body portion designated by the numeral 1 and provided with an annular cavity 2. The body portion is mounted upon an annular base comprised of the two layers of rubber composition 3 and 4. The tire composed of base and body portion is vulcanized to a metallic rim 5.

In forming the tire, the base and body portions of the tire are pre-formed separately. While this may be accomplished variously, a convenient way is to assemble on or about a metallic rim 5, vulcanizable rubber composition 4 of a suitable nature to bond well to metal, one, for instance, high in sulphur and with preferably a powdered metal, such as aluminum, distributed in the mass. This base portion may be built up on the rim in any suitable manner, as by winding a strip or strips of stock one or more times around the rim, or by tubing the material. Preferably, the hardest composition is located immediately adjacent the metallic rim and a slightly softer composition, such as indicated at 3, located above the same and attaining a thickness approximating the height of the side flanges 6. And preferably, but not necessarily, the base portion has its upper surface inclined upwardly towards the center of its outer periphery. After the base has been formed, it is then vulcanized in any suitable manner, as by wrapping or by confining in the sections of a mold (not shown).

In its preferred embodiment, the rim comprises a metallic cylinder 5 provided with flanges 6 at its edges whereby a tire channel is formed in the rim. The surface of the rim is provided with grooved or dove-tailed projections 7 to interlock with the layer of hard rubber of the base portion of the tire. The rim is unbroken throughout its extent.

The body portion of the tire indicated generally at 1, is made of vulcanizable rubber composition, which cures in a softer and more yielding condition than the base portion, it being amassed in any suitable manner, as by tubing or plying up a strip of stock about a form or sectional core (not shown), and given a more or less permanent shape by vulcanizing partially or completely between the sections of a mold.

After the base and body portions have been separately formed and vulcanized (more or less completely), they are then united together permanently. While this may be accomplished by the application of heat with the tire confined in a mold, it is preferable to employ a cold or self-curing cement requiring very little or no heat above room temperature to unite the bottom faces of the side walls of the body portion to the upper faces of the base portion. The cement may be applied to either or both of the opposed surfaces and it is preferable to exert pressure on the parts while seaming them together, as indicated at 8.

It is quite obvious that the invention is capable of many changes and is not confined to the details specifically disclosed. The form of the cavity in the body portion is obviously variable, likewise the shape and configuration of the metallic rim and the opposed faces of the base and body portions.

The internal diameter of the body portion is of course made equal to, or slightly less than, the external diameter of the base portion upon which the side walls of the body are seated. And preferably, the diameter common to the seamed together faces is approximately equal to the diameter of the free edges of the rim flanges 6, if the rim is provided therewith. But this diameter may be greater or less than that of the free edges of the rim flanges, the latter being of particular advantage in concealing the seam from sight and protecting it. When cement is used to unite the parts together, as is the preferred procedure, it is desirable to apply pressure to secure a strong union, and this pressure may be derived from external confining molds or wrappings, or by making the body portion of a diameter requiring it to be stretched in order to seat upon the outer periphery of the base portion.

From the foregoing, it will be seen that a tire of great strength has been formed, having the resilience of a hollow cushion tire due to the air entrapped in the cavity of the tire. Such a tire is so constructed as to be securely held by its supporting rim throughout the most severe usage. Since the rim is structurally of substantially equal strength throughout its extent, all danger of collapse of the tire from this source is eliminated.

For an understanding of the scope of the invention, reference should be made to the accompanying claim.

Having thus described my invention, what I claim and desire to protect by Letters Patent is:

A unitary cushion tire comprising and arranged in radially outward succession, a metallic base, a layer of hard rubber composition, a layer of softer rubber composition having sloping outer surfaces meeting at substantially the center thereof, and a tread layer of rubber composition softer than the second mentioned layer and having sloping inner surfaces for engaging the sloping surfaces of the second mentioned layer and centering the tread layer, there being an inwardly open annular air pocket in the tread layer closed by the second mentioned layer.

Signed at New York, county of New York, State of New York, this 4th day of October, 1926.

GEORGE F. FISHER.